May 20, 1924.
J. F. TINGSTROM ET AL
1,494,722
COMBINATION LEVEL AND BEVEL
Filed March 21, 1921     2 Sheets-Sheet 2
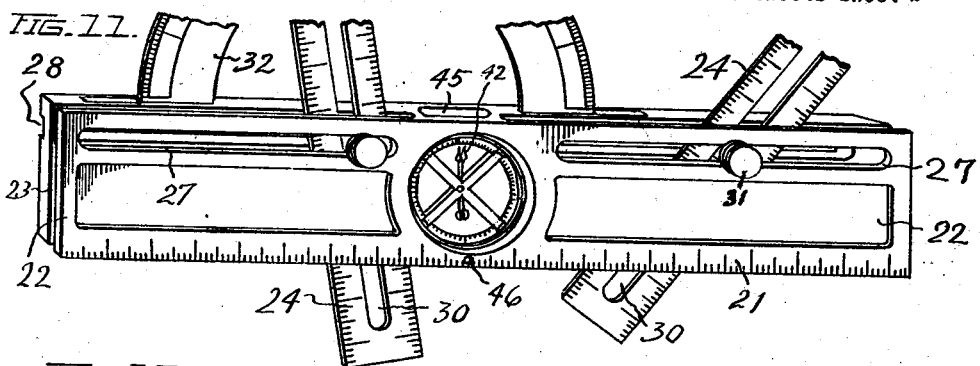
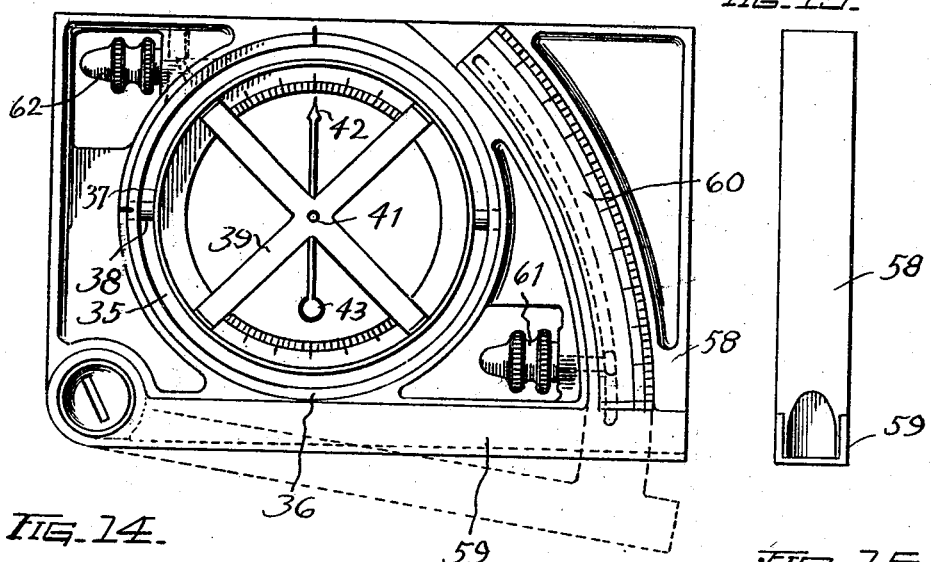
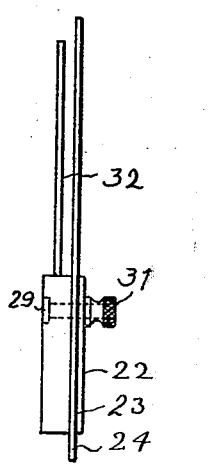
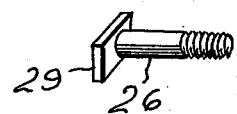
INVENTORS:
Jesse F. Tingstrom
Morris Siegel
By Atty:
Frederic M. Keeney.

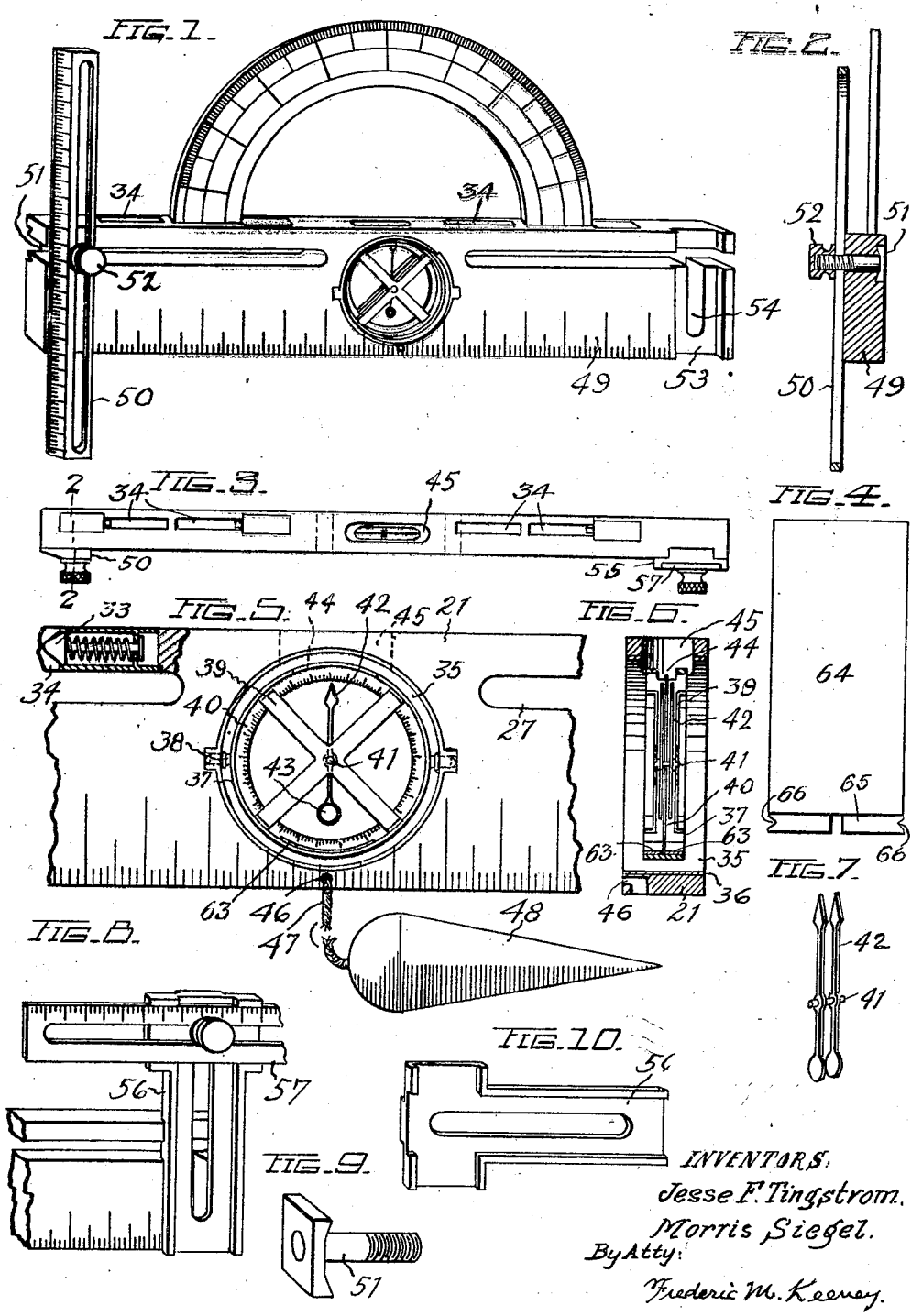

Patented May 20, 1924.

1,494,722

UNITED STATES PATENT OFFICE.

JESSE F. TINGSTROM AND MORRIS SIEGEL, OF LOS ANGELES, CALIFORNIA.

COMBINATION LEVEL AND BEVEL.

Application filed March 21, 1921. Serial No. 454,155.

*To all whom it may concern:*

Be it known that we, JESSE F. TINGSTROM and MORRIS SIEGEL, citizens of the United States, and residents of Los Angeles, in the county of Los Angeles and State of California, have jointly invented a new and useful Combination Level and Bevel, of which the following is a specification.

This invention relates to an adjustable measuring device provided with a graduated scale, and the combination therewith, of a leveling device. In leveling devices heretofore used, the means for determining the level has consisted of a sealed tube containing a liquid, a minute portion of which is displaced by an air bubble. The bubble will always seek the uppermost level or plane, and the tube is arranged so that when the level body is on a level plane surface, the bubble is seen at the center of the tube. This device is frequently affected by dampness, is delicate for handling, and the tube therein is subject to breakage.

To avoid these objections, we have provided an annular member mounted on trunnions, and weighted to assume the indicating position by gravity, standards within the ring, and a double indicating needle which is normally maintained in the indicating position by gravity, a dial being arranged to cooperate with the needle to indicate the degree of inclination of the surface to which the device is applied.

The object of this invention is to provide a level indicator which may be cheaply constructed, which is not liable to get out of order, and which is combined with means for determining a bevel, and the axial center of cylinders and cylindrical solids.

Another object of this invention is to provide a detachable and adjustable gage in combination with the level body, and arranged for measuring linear dimensions and adjustable to any angle for measuring inclined faces. The device is further provided with a detachable protractor which may be set in central position for general use, and in position to set the angularly adjustable gage at any desired angle, and is further provided with an adjustable cross-gage, the angularly adjustable gage and the cross-gage being arranged to be clamped in position by thumb-screws, or removed at the will of the operator.

The preferred means by which we have accomplished the objects of the invention are illustrated in the accompanying drawings, and are hereinafter specifically described. That which we believe to be new is set forth in the appended claims.

In the drawings, Figure 1 is a perspective view of our improved level and bevel, the cross-gage being detached from the body portion of the device. Fig. 2 is a cross-section of the device taken approximately on line 2—2, of Fig. 3, and showing an angularly adjustable gage clamped thereto. Fig. 3 is a top plan view of the device. Fig. 4 is a side view of a detachable portion adapted for determining the center of a circular surface. Fig. 5 is a fragmentary and detail view of the leveling means. Fig. 6 is a transverse section of the body, showing the leveling means therein. Fig. 7 is a perspective detail view of the double needle for indicating the degree of level. Fig. 8 is a fragmentary detail view showing a modified form of adjustable slide and gage-holder. Fig. 9 is a perspective view of a clamp element. Fig. 10 is a perspective detail view of the slide shown in Fig. 8. Fig. 11 is a perspective view of the preferred form of the invention, parts of the gages and protractor being broken away. Fig. 12 is a side view of a modified form of the invention. Fig. 13 is an end view of the device shown in Fig. 12. Fig. 14 is an end view of the device shown in Fig. 11. Fig. 15 is a perspective detail view of the clamp member for the gages shown in Fig. 11.

Referring to the drawings, our improved combination level and bevel as shown in Figs. 5, 6, 7, 11, 14 and 15, consists of a body 21, having slotted ends 22, provided with vertical and longitudinal slots 23, to receive the gages 24, and provided with intersecting slots 27, through which the clamp members 26 project. The slots 27 co-extend with grooves 28, which are adapted to receive the heads 29, of clamps 26. Gages 24 are provided with longitudinal slots 30, the cylindrical portions of clamps 26 extending therethrough and engaging with nuts 31, Fig. 14, to bind the parts rigidly together. To adjust the gage members to the desired inclination or angle, we have provided a detachable protractor 32, secured by spring-pressed plungers 33, Fig. 5, which project in the slots 34, adapted to receive the ends of the protractor. A slight pull will serve to detach the protractor element from the body of the device. The protractor may be attached to the body for adjustment of either of the gages.

The body is provided with a circular and central aperture 35, in which is mounted a fixed circular frame 36. An annular ring 37, is provided with trunnions 38, journalled in the frame 36. Standards 39 are mounted in the ring, and spaced apart from the dial 40 which is fixed to the ring. A pointer shaft 41 is journalled in the standards, and has mounted thereon, the pointers 42, provided with weighted ends 43. The pointers are thus operated by gravity, and cooperate with the dial to indicate the angle of inclination of the surface to which the level is applied, the dial being provided with suitable graduations, and the standards being arranged so that the graduations may be read by the operator when the body is in horizontal or vertical position. The device may indicate the plumb or vertical inclination. The ring 37 is provided with an aperture 44 Fig. 5, and the edge of the dial and pointers may be observed through the aperture 45 Fig. 11 in the body and normally opposite the aperture 44. The body is provided with an aperture 46 for securing thereto the detachable cord 47 and weight 48, which serve as a plumb-bob.

In the modified form shown in Figs. 1 and 2, the body portion 49 has clamped thereto the gage 50, which is adjustable to any angle, and clamped in adjusted position by means of the clamp 51 and nut 52. The opposite end of the body is provided with a groove 53 and slot 54. The slide 55, as shown in Fig. 3, or the slide 56 as shown in Figs. 8 and 10, may be inserted and clamped in the groove 53. The gage 57 may be clamped in the slide so as to be parallel with the body, or at a right angle thereto.

In the modified form shown in Figs. 12 and 13, the body 58 has pivotally connected thereto the arm 59, provided with an arcuate extension 60, and is secured in an angular position with the body by the clamp 61. The frame 36, supporting the leveling means, is adjustable to two positions, and secured by the clamp 62.

From the foregoing it may be seen that we have provided simple and efficient means for ascertaining the level or inclination of an object, and the vertical deviation thereof. The ring 37 is provided with a weight element, 63, serving, when the level body is applied to a laterally inclined surface, to maintain the ring in a relatively vertical position, allowing the pointers to work freely in many positions of the level. The leveling device, including the circular supporting frame, may be applied to all kinds of machining tools and machines, which require to be leveled when installed.

The detachable member 64, shown in Fig. 4, has a projecting end 65, provided with opposed notches 66, and adapted to be inserted in holes 34, the notches 66 engaging with spring-pressed plungers 33. The protractor member is provided with correspondingly notched ends.

What is claimed is:

1. In a level, the combination with a rectangular body having a longitudinal and vertically disposed slot in each end, and a horizontal and transversely disposed slot intersecting the vertical slot, of slotted gauge elements mounted in the vertical slots, clamp members mounted in the transverse horizontal slots and extending through the slotted gauge elements, leveling means mounted in the body, and a detachable protractor clamped to the body and between the slotted gauge elements.

2. In a level, the combination with a body having a vertical slot in each end, a series of rectangular slots in the top, and a horizontal and transversely disposed slot intersecting each vertical slot, of a detachable protractor mounted on the body and secured in the rectangular slots, slotted gauge elements mounted in the vertical end slots, clamping members extending through the slotted gauge elements and through the transversely disposed slots, angular heads on the clamping members engaging with the transverse slots to prevent turning movement, binding nuts on the opposite ends of the clamping members, and leveling means mounted in the body and between the slotted gauge elements and beneath the detachable protractor.

3. In a level, the combination with a body having a central cylindrical aperture, of a ring smaller than the aperture and mounted therein, weight elements fixed to the ring, and serving to retain the ring in indicating position, trunnions on the ring and in engagement with the body, a dial carried by the ring, standards in the ring and on either side of the dial, a needle indicator journalled in the standards, and having its pointer end adjacent to the dial, and a weighted end on the indicator serving to maintain its pointer end uppermost.

4. In a level, the combination with a body having straight edges and flat sides, and a circular aperture extending transversely therein and a longitudinal aperture extending angularly relative to the circular aperture, of a weighted ring pivotally mounted within the circular aperture and having a longitudinal aperture opposite the weighted portion thereof, and normally adjacent to the corresponding longitudinal aperture in the body, an annular indicating dial mounted within the ring, standards mounted within the ring and disposed on opposite sides of the dial, a pointer shaft mounted within the standards, and weighted pointers mounted on the pointer shaft and on opposite sides of the dial, the said dial and pointers being observable through the longitudinal apertures in the body and ring.

5. In a level, the combination with a body having straight edges, flat sides and slotted ends, and a circular aperture extending transversely through the body, of slotted gages mounted in said slotted ends, means for rigidly clamping the gages to the body, a detachable protractor member mounted on the body and cooperating with one of the gages for angular adjustment thereof, means for securing the protractor to the body, a ring rotatively mounted in the circular aperture, a dial within the ring, standards fixed within the ring, and a weighted pointer journalled in the standards and cooperating with the dial.

6. In a level, the combination with a body having straight edges, flat sides, and formed with slotted ends and a central circular aperture, level indicating means mounted within the central aperture, a detachable protractor mounted on the body, spring-pressed plungers engaging with the protractor ends and securing the protractor to the body, gages mounted in the slotted ends of the body and cooperating with the protractor, and means for clamping the gages rigidly to the body.

7. In a level, the combination with a body having straight edges and flat sides, said body being formed with a circular and central aperture and slotted ends, of slotted gages mounted in the slotted ends, means for clamping the gages in angular positions relative to the body, a detachable protractor mounted on the body and cooperative with the gages, means for securing the protractor in operative position and leveling means mounted within the circular aperture.

8. In a level, the combination with a rectangular level body, of weighted leveling means mounted therein, said body having a transverse groove and slot in one end, a slide mounted in said groove, a gage mounted in said slide and disposed parallel with the body, and means for clamping the slide and gage in rigid positions.

In testimony whereof, we hereunto affix our signatures this 24th day of February, 1921.

JESSE F. TINGSTROM.
MORRIS SIEGEL.